United States Patent
Yanagi et al.

(10) Patent No.: US 6,856,998 B2
(45) Date of Patent: Feb. 15, 2005

(54) PROGRAM FOR GENERATING METHOD RETRIEVAL INFORMATION AND AN ARITHMETIC PROCESSING APPARATUS

(75) Inventors: Hiroyuki Yanagi, Kyoto (JP); Shinji Nakagawa, Kyoto (JP); Motoyuki Katoh, Kyoto (JP); Yosuke Baba, Kyoto (JP)

(73) Assignee: Omron Corporation (JP)

( * ) Notice: Subject to any disclaimer, the term of this patent is extended or adjusted under 35 U.S.C. 154(b) by 0 days.

(21) Appl. No.: 09/828,120

(22) Filed: Apr. 9, 2001

(65) Prior Publication Data

US 2002/0016865 A1 Feb. 7, 2002

(30) Foreign Application Priority Data

Apr. 11, 2000 (JP) .......................... 2000-108965

(51) Int. Cl.$^7$ ............................. G06F 17/30
(52) U.S. Cl. ................................. 707/103 R
(58) Field of Search ................. 707/3, 103 Y, 707/103 R, 1, 100

(56) References Cited

U.S. PATENT DOCUMENTS 5,710,727 A * 1/1998 Mitchell et al. ............ 702/128
5,915,252 A * 6/1999 Misheski et al. ........ 707/103 R
6,463,565 B1 * 10/2002 Kelly et al. .................... 716/1

OTHER PUBLICATIONS

Ellis et al. (The Annotated C++ Reference Manual), 1990, pp. 227–231.*
Lindholm, Tim and Yellin, Frank, The Java Virtual Machine Specification, Second Edition [online], [retrievied on Aug. 18, 2003]. Retrieved from the Internet: <URL: http://java-.sun.com/docs/books/vmspec/2nd–edition/html/Concepts.doc.html>Chapter 2, Sections 2.1–2.19.
jGuru: Language Essentials, Short Course [online], Feb. 2001 [retrieved on Aug. 18, 2003]. Retrieved from Internet: <URL: http://developer.java.sun.com/developer/onlineTraining/JavaIntro/contents.html>.

* cited by examiner

Primary Examiner—Safet Metjahic
Assistant Examiner—Haythim Alaubaidi
(74) Attorney, Agent, or Firm—Dickstein Shapiro Morin & Oshinsky LLP

(57) ABSTRACT

Method and class tables and an algorithm are provided for use in determining if a called method in a message should be retrieved and executed or a method search should initiated. The method table includes method name, method identifier, method overwrite data, class overwrite data and method memory storage location associated with the method related to the overwrite data. The algorithm sets a plurality of variables to an entry in the class table and at least one method and class data referenced in a message, searches the method table and sets search variables to the class and method overwrite data and determines if a predetermined relationship exists between the method and class identifier associated with the class and method data in the message as well as data in one of method entries. The method memory storage location is read out once a method entry with the predetermined relationship is found.

13 Claims, 13 Drawing Sheets

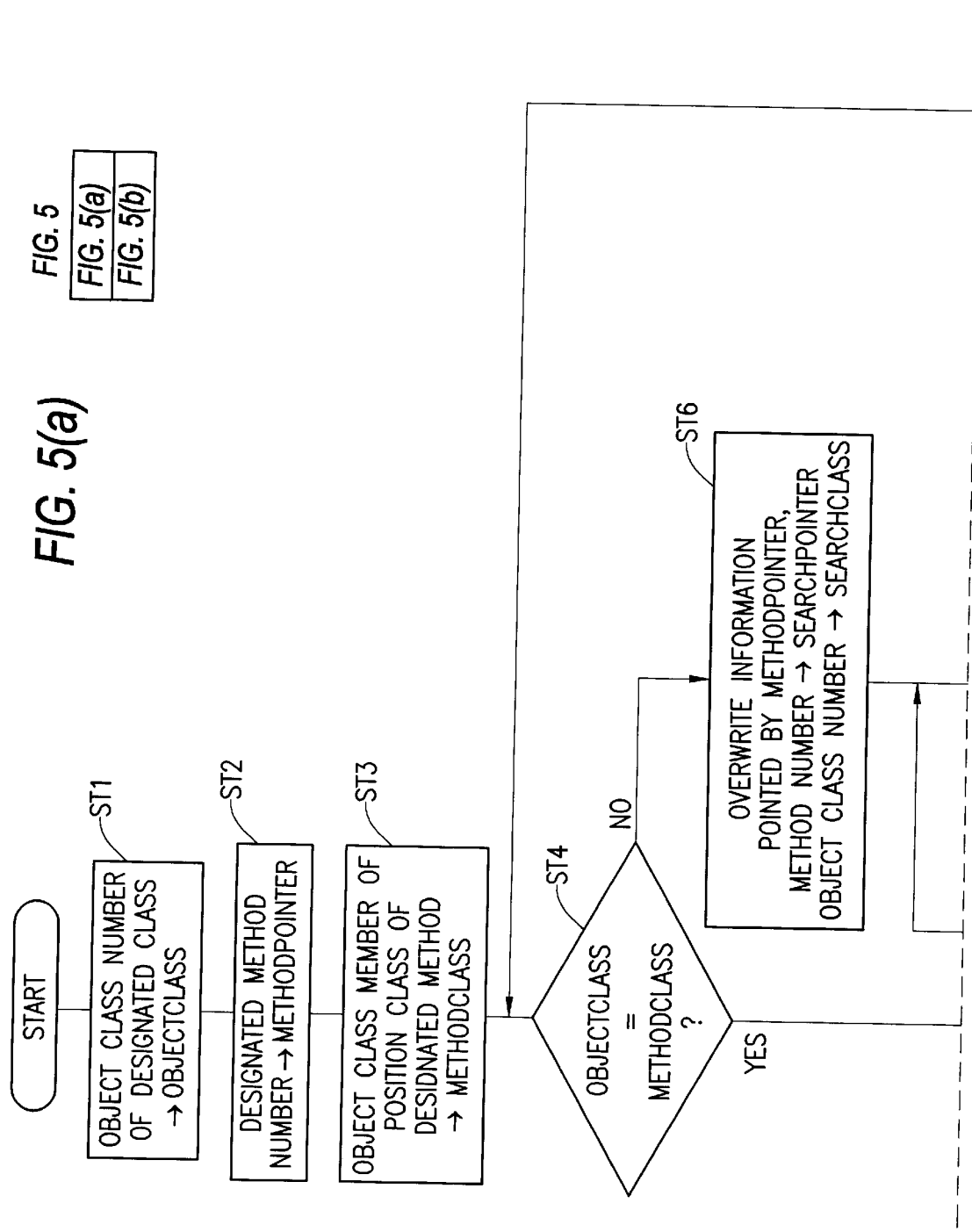

US 6,856,998 B2

PROGRAM FOR GENERATING METHOD RETRIEVAL INFORMATION AND AN ARITHMETIC PROCESSING APPARATUS

BACKGROUND OF THE INVENTION

1. Field of the Invention

This invention relates to methods for generating retrieval information to execute a retrieval for specifying a stored location of a method called according to a method call when an object oriented program is executed (hereinafter called "method retrieval"), and arithmetic processing apparatuses for executing the called method by executing the method retrieval employing the retrieval information generated by the methods.

2. Description of the Related Art

In conventional information processing systems with object oriented programming, properties and methods included in the classes at higher order (super classes) are automatically succeeded by the classes at lower order (subclasses), and the methods are overwritten ("override" is usually used in Java language instead of "overwrite") in the subclasses if necessary. Program of each method is stored in a predetermined area within a memory, and a predetermined method is called in a class in execution, thereby retrieving the stored location for the method.

For example, in C++ programming, link information by a virtual function is buried into a method call program on compilation, thereby specifying a stored location of the method upon a method call. In Java programming, retrieval employing a hash table hereinafter called ("hashing") has been proposed (Japanese Laid-open Patent Publications Hei 5-120022 and 8-278894).

In the conventional method for setting link information on compilation, the compilation has to be repeated by resetting the link when the design is changed by changing the class ovewriting the method, thereby extremely deteriorating development efficiency of the system.

According to the hashing, a character string providing method name and message for method call is converted into a hash value, and a hash table is generated associating the hash value and the storage location of the method. Thereby, when setting of overwriting methods is changed, compilation only for the class to be changed is necessary to be repeated and setting the hash table of the class has only to be changed, so that design change of programs may be easily resolved. The hashing, however, requires ensuring a memory area corresponding to a predetermined number of hash values, but a memory area for unused hash values is ensured, resulting in waste of the memory source.

Moreover, the hashing has the risk of collision where the same hash value is assigned to different methods. In order to avoid such collision, according to a separation chain method or open address hashing, unique retrieval keys are respectively set to the hash values in connection, resulting in complication of the data construction and increase of the memory capacity. When retrieval is executed, a character string before conversion to the hash value is compared with an entry content of the hash table to confirm whether or not a correct retrieval key corresponding to the character string is chosen, thereby inviting the problem that the retrieval takes time and the processing capability of the apparatus is extremely deteriorated.

SUMMARY OF THE INVENTION

It is, therefore, a primary object of this invention to greatly reduce the capacity of the retrieval information necessary for method retrieval to utilize the memory resource effectively.

It is another object of this invention to set retrieval information in the connection structure based on a hierarchical relationship between classes.

It is further object of this invention to greatly improve the efficiency of the system development by easily coping with design change such as changing the class overwriting the method by the connection list of the above-mentioned retrieval information.

According to a first aspect of this invention, there is provided a method for generating method retrieval information of a predetermined method succeeded by a plurality of classes having a hierarchical relationship, including the steps of setting information specifying a stored location for the predetermined method and the method overwriting the predetermined method, and generating retrieval information where each of the set information is connected one after another based on a hierarchical relationship between position classes of the respective methods.

As an example, the information specifying the stored location is an address of a stored field for a method within a memory or a pointer for designating the address, and a value showing a representative address such as a starting address within the field is set. Information of the respective methods is assigned by class name of classes belonging to the respective methods or identification numbers corresponding to the classes, which is subsequently set by connection from a super class to a subclass through the information relating to these classes. A class divided from a super class directly unrelated to overwriting of the methods may be installed into the connection list based on a positional relationship of a hierarchy observed from the upper class.

In order to specify the stored location of the method behaving in the classes having a hierarchical relationship, information specifying a stored location is set for each of the above-mentioned method and a method overwriting the method, and retrieval information is generated by connecting the respective set information in series based on the hierarchical relationship between the classes to which the respective methods belong, thereby simplifying a data construction of the information expressing the stored location of method, avoiding the necessity of establishment of unnecessary memory area, and utilizing the memory resource. Moreover, it may be easily resolved by changing connection that a class overwriting a method is changed or added by design change of a program, thereby greatly improving the efficiency of the system development.

According to a second aspect of this invention, there is provided an arithmetic processing apparatus including a program executing means for executing an object oriented program, a memory storing retrieval information to retrieve the stored location of a method called by each of a plurality of classes having a hierarchical relationship generated by the object oriented program, and a retrieval means for specifying the storage location of the method to be called by retrieving the retrieval information when a call message is applied to the program executing means. The retrieval information includes information connected with the information specifying a stored location of a method and the method overwriting above-mentioned method for each kind of methods based on a hierarchical relationship between position classes of the respective methods.

As an example, the program executing means executes a program of byte codes compiled from source codes of an object oriented program language developed by Sun Microsystems Inc. (Java, trademark owned by the company) The program executing means and the retrieval means are executed by a program run mechanism according to the executed program language, or a processor having a software or hardware such as an interpreter or a compiler.

The storage location of the method is specified by retrieving the retrieval information including the information connected with the data specifying the storage location of the method, thereby speeding up the method retrieval processing by a simplified retrieval path. The construction of the retrieval table is simplified, whereby the memory capacity may be reduced and the manufacturing cost of the apparatus also may be reduced.

According to a third aspect of this invention, there is provide an arithmetic processing apparatus according to the second aspect of this invention wherein the memory includes a method retrieval table for storing the information specifying the stored location of the method in a connected fashion based on a hierarchical relationship between position classes of the respective methods, and a class retrieval table for storing the hierarchical relationship of each class set by hierarchical relationship. The retrieval means subsequently revises an aimed class in a direction rising with hierarchy from the class calling the method based on the class retrieval table to be subsequently retrieved in a direction going down with hierarchy from the method designated by the message, thereby extracting information corresponding to the aimed class.

When a method is called by a predetermined class, the connection list of the retrieval information based on the class name or the identification number of the designated class is retrieved to find a stored location of the method so as to be retrieved. When the method is overwritten by a specifically designated class, the connection list includes information uniquely specifying the stored location of the overwritten method, thereby allowing the stored location of the method to be correctly obtained. When a designated class calls a method succeeding in silence from a class at higher order, the stored location of the succeeding method may be specified by retrieving the connection list of retrieval information based on the class name or identification number of the class at higher order.

In the retrieval information, the information representing the stored location of the overwritten method is connected in a hierarchical relationship, thereby avoiding such a risk of the collision by the same key assigned to a plurality of methods as described in the above-mentioned hash table, and making it unnecessary to secure any memory field for unused data. In order to delete the overwritten method, the information specifying the stored location of the method is deleted and the information before and after the deleted information is connected. When a method is freshly overwritten by a predetermined class, information specifying a stored location of the method is newly made to be added at a predetermined location of the connection list based on a hierarchical relationship with other class.

According to the third aspect of this invention, when the designated method is not overwritten by the designated class, the method retrieval table is retrieved by changing an aimed class in an upper class of the class based on the class retrieval table, thereby obtaining a stored location of the method where the designated class is succeeded from its upper class. When a class where the method is overwritten is designated to execute a method in a class at higher order, a stored location of the method belonging to the designated class may be obtained by extracting the information corresponding to an aimed class along a link in a direction subsequently taking down the hierarchy from the method designated in the method retrieval table.

Thus, the arithmetic processing apparatus may correctly specify the storage location of the method to be executed for execution of the method either when the class designated by the message of method call overwrites the method or when the super class is succeeded by the method, thereby avoiding any erroneous operation on method calling.

BRIEF DESCRIPTION OF THE DRAWINGS

Other objectives and advantages of this invention will be more readily apparent from the following detailed description provided in conjunction with the following figures, of which.

DETAILED DESCRIPTION OF THE PREFERRED EMBODIMENTS

Figure 1:
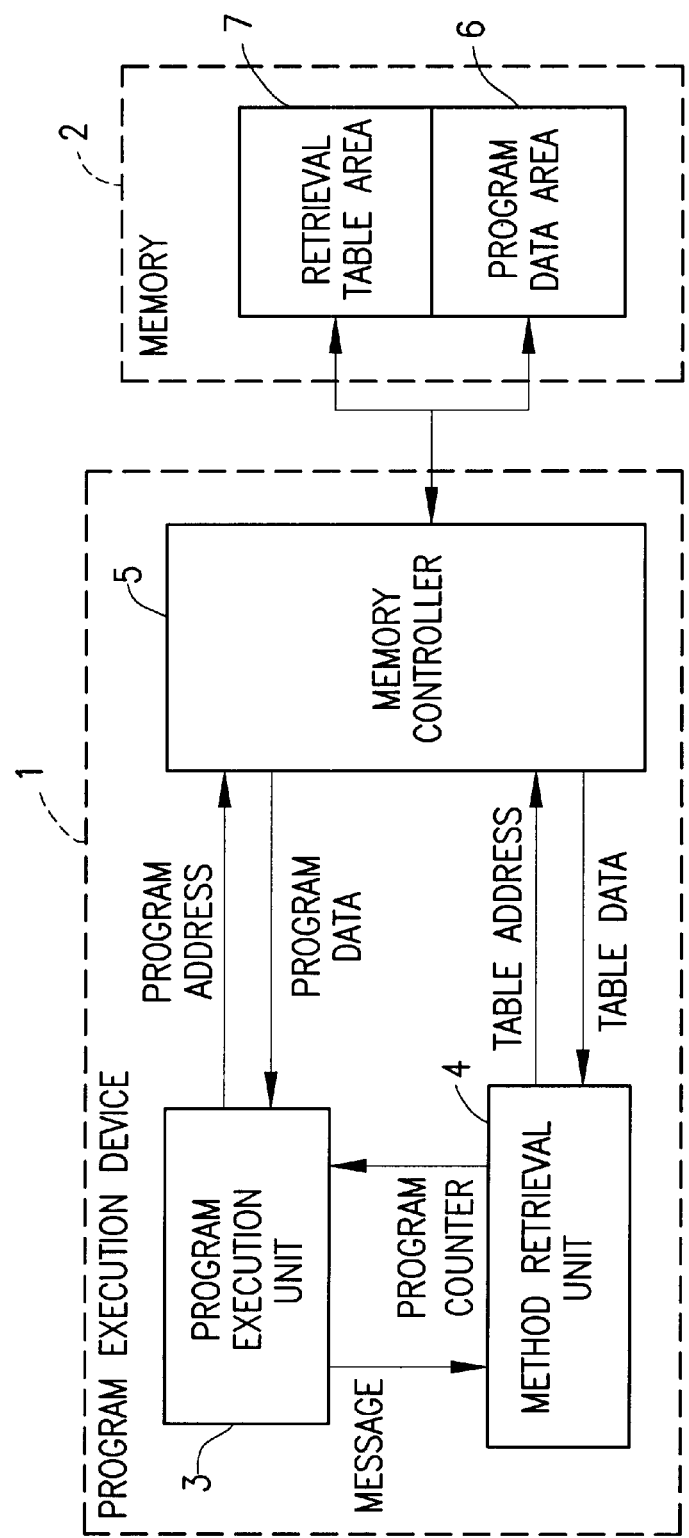
FIG. 1 is a schematic block diagram of an arithmetic processing apparatus as a preferred embodiment of this invention.

Referring, now, to FIG. 1, there is shown a schematic block diagram of an arithmetic processing apparatus as a preferred embodiment of this invention. The processing apparatus includes a program execution device 1 and a memory 2 to execute information processing based on a program written by Java. The program execution device 1 is a processor accommodating a circuit executing a byte code by Java, and includes a program execution unit 3, a method retrieval unit 4, and a memory controller 5. The memory 2 includes either or both of ROM and RAM provided with a storage area having a program data area 6 and a retrieval table area 7.

The program data area 6 stores a program of a byte code compiled by a source program of Java (a program for one address is called "program data" hereinafter). The retrieval table area 7 houses therein a class table 8 and a method table 9 as described later to retrieve the location housing a called method on a method call.

Memory access in the program execution device 1 is controlled by the memory controller 5. The program execution unit 3 is executed by assigning a program address designating a storage location for the program data to be read to the memory controller 5 to obtain the corresponding program data from the program data area 6. Particularly, when the program data is a message representing a method call, the program execution unit 3 transmits the message to method retrieval unit 4 to demand the retrieval for the storage location of the method.

The message includes class name belonged by the object of the message, method name of the method to be executed, existence of an argument and a return value, and data showing its type. In response to the message, the method retrieval unit 4 recognizes a class belonged by the object of the message and the designated method to retrieve the storage location of the method by using the retrieval table. This retrieval process is executed by designating an address (TABLE ADDRESS in FIG. 1) of the stored location of the retrieval information necessary in the retrieval table area 7 to the controller 5 for reading information. The TABLE ADDRESS is given by a pointer designating an entry location of each retrieval table or a value representing address of area corresponding to the entry location in memory 2.

The method retrieval unit 4 obtains a starting address of the stored location of the designated method (hereinafter called "program starting address") as a result of the retrieval, and transmits the program starting address to the program execution unit 3 as a program counter. The program execution unit 3 sets a work area for the above-mentioned method in a memory area for stack (not shown in drawings), and subsequently reads out each program data providing the method from the program data area 6 starting at the address pointed by the program counter to execute the process of each program data.

Figure 2:
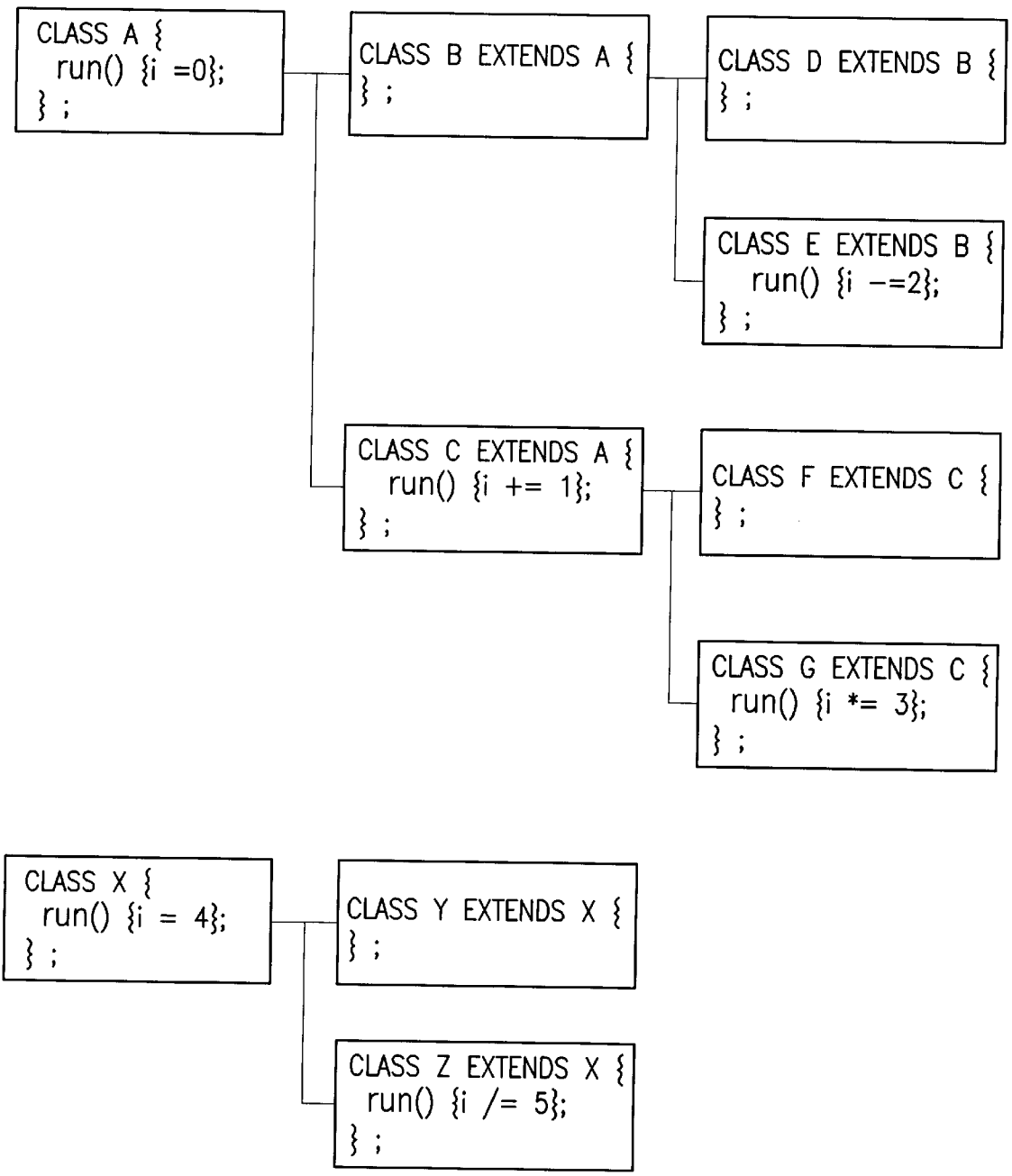
FIG. 2 shows a class relationship representing an example of class generating and its hierarchical relationship.

FIG. 2 shows a class relationship representing an example in which a class is generated by the above-mentioned program, and the structure of the retrieval table for method retrieval will be explained hereinafter referring to the hierarchical relationship shown in FIG. 2. In FIG. 2, class names of ten classes are expressed by letters "A to G" and "X to Z", and the type ("class" plus "class name") such as "class A" is employed to express each class individually.

Within the block of each class of FIG. 2, there is shown setting about a super class of the class and run method succeeded between classes.

Classes A an X are independent each other, and provided with run( ) methods having different behavior and no overwriting relationship. Six classes B to G are generated from the class A, in which each of classes E and C is overwritten by the run( ) method of the class A and the class G is overwritten by the run( ) method of the class C. Two classes Y and Z are generated from the class X, and the run( ) method of class X is overwritten in the class Z. The classes B, D, F and Y not provided with their own run( ) methods succeed run( ) methods from their super class in silence, respectively.

Figure 3:
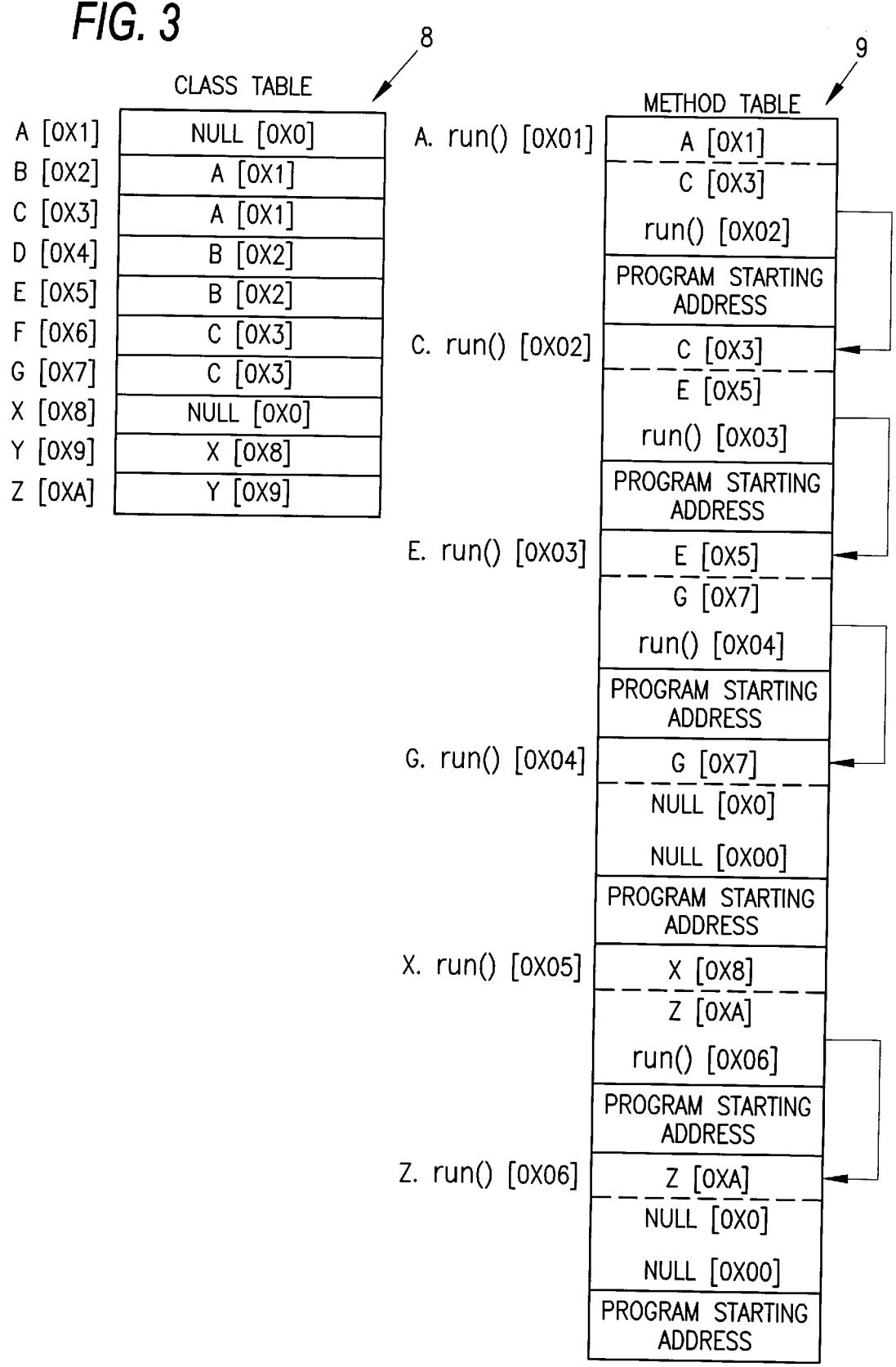
FIG. 3 is a view showing an example of a data structure of a retrieval table.

In this embodiment, an to the designated method, there are provided two kinds of tables as shown in FIG. 3 within the method retrieval table to retrieve a stored location of a method within the program data area 6.

A first table 8 is a class table showing a hierarchical relationship of each class, and one entry is assigned for each of the above-mentioned ten classes, wherein each entry stores information expressing a super class of the class.

In this embodiment, each class is assigned by an identification number composed of two numbers in hexadecimal notation, such as 0×1, 0×2, . . . , 0×A (hereinafter this identification number is called "object class number"). This object class number serves as a pointer expressing an entry position of each class in the class table 8, and each entry stores the object class number expressing a super class of the class assigned to the entry. Empty data "null" is stored at the entries of most significant classes A and X having no super class.

A second table 9 is a method table storing information about each method, and stores information about the respective run( ) methods "C.run( ), E.run( ), G.run( ), and Z.run( )" generated by overwriting in classes C, E, G, and Z in addition to run( ) methods "A.run( ) and X.run( )" belonging to the classes A and X.

In this embodiment, the respective run( ) methods same as the above-mentioned classes are assigned by unique numbers (hereinafter called "method number"). This method number is also composed of the combination of numbers in hexadecimal notation, but numbering of low order is set to two digits to be distinguished from the above-mentioned class object numbers. Each method number serves as a pointer expressing an entry position of each method.

The method table 9 at each entry thereof, as to the method assigned by the entry, stores therein the object class number of the position class of the method (for instance, if it is A.run( ), the object class number [0×1] of class A), the program starting address expressing the stored location of the method, and overwrite information expressing how the method is overwritten. The overwrite information is composed of the object class number of the class overwriting the corresponding run( ) method, and the method number of the method generated by overwriting.

Though the relationship expressed in this overwrite information not always precisely expresses status of the actual overwrite, method information about the position class and the stored location of each method is connected in series along the hierarchy among a plurality of classes generated from one class (class A or X). This data structure is called "connection list of method information" hereinafter.

Relating to the respective classes generated from the class A in FIG. 2, A.run( ) is overwritten in the classes C and E respectively, and C.run( ) is overwritten in the class G. Each method information in the method table 9 of FIG. 3 is connected in series in the order of A.run( )→C.run( )→E.run( )→G.run( ). As to the G.run( ) at the end of the connection list, empty data "null" is stored in the object and method numbers of the overwrite information.

A pair of connection lists "A.run( )→E.run( )" and "A.run( )→C.run( )→G.run( )" may be set in order to precisely trace the relationship of original overwrite. As described above, however, the size of the method table 9 may be minimized by uniting connection lists of method information between classes having a hierarchical relationship with the class A by the virtual overwrite information.

The order of connection about the method information is not limited to the above order, and may be "A.run( )→E.run ( )→C.run( )→G.run( )" or "A.run( )→C.run( )→G.run ( )→E.run( )". However, it is not allowed to locate E.run( ) before A.run( ) against the original hierarchical relationship.

Figure 4:
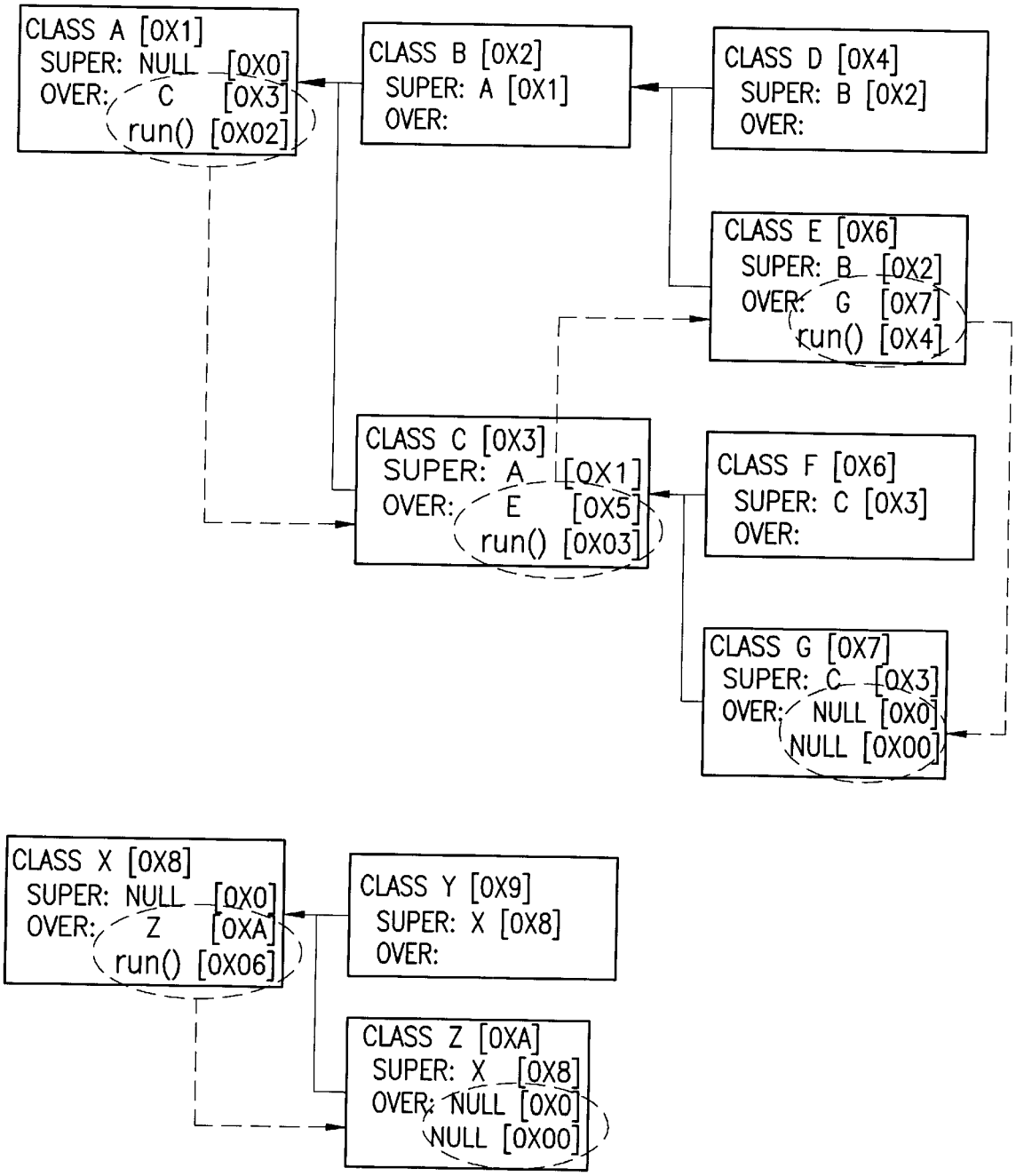
FIG. 4 shows a class relationship showing a retrieval path by the retrieval table of FIG. 3.

FIG. 4 shows a class relationship rewritten from the class relationship view of FIG. 2 to express a retrieval process flow according to the class table 9 and the method table 9 of FIG. 3. An arrow mark shown in solid lines expresses a retrieval path of a super class, and an arrow mark shown in dotted lines expresses a path retrieving an overwrite relationship of run( ) method based on the connection list of the above-mentioned method information. Within the block of each class, there is shown a class name and an object class number of the class together with an object number of the super class and overwrite information based on setting in the method table 9 of FIG. 3.

Figure 5B:
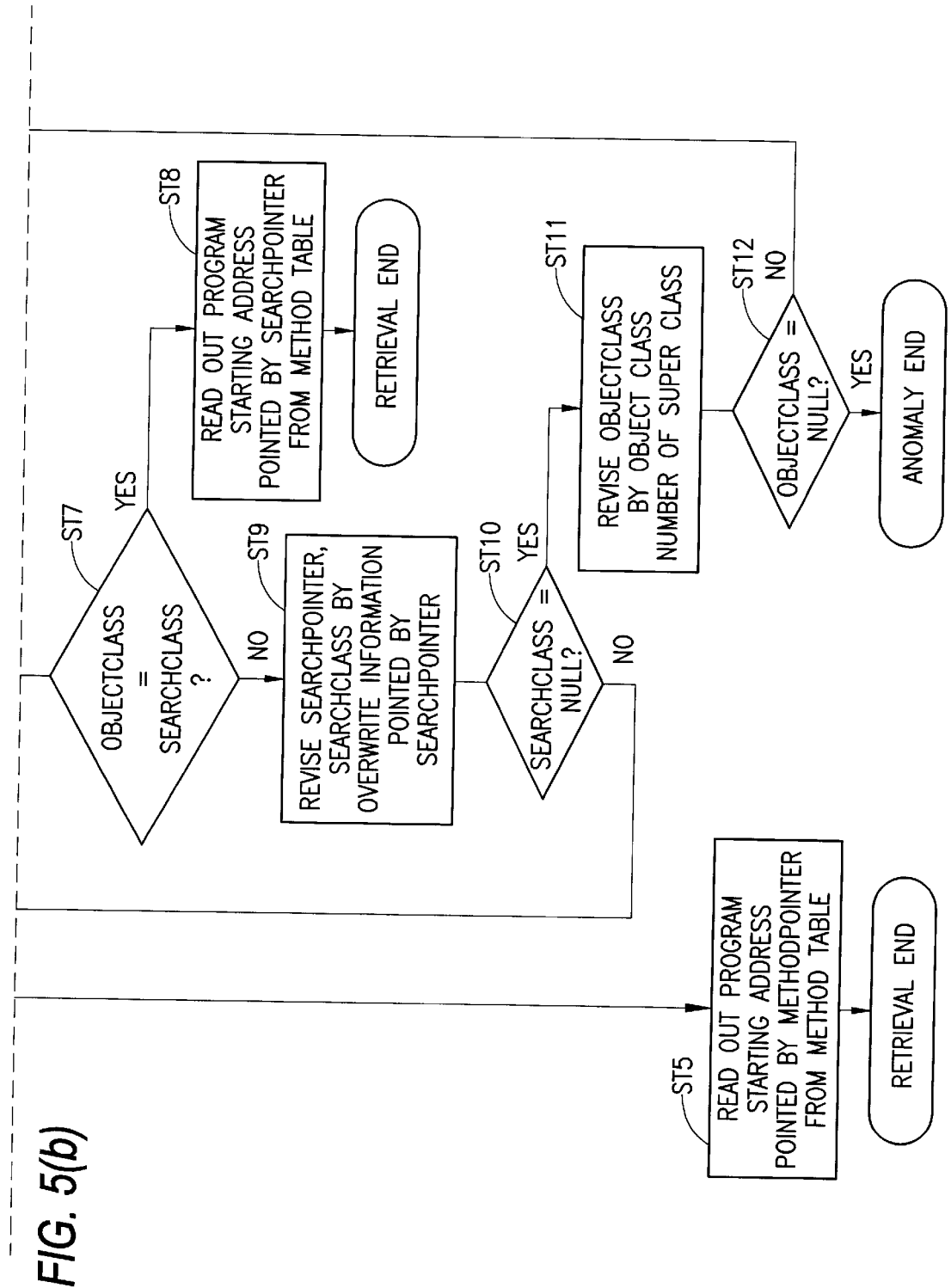
FIG. 5 is a flow chart showing a procedure of method retrieval.

FIG. 5 is a flow chart showing a process in the method retrieval unit 4 by employing the class table 8 and the method table 9. ObjectClass, MethodPointer, MethodClass, SearchPointer, and SearchClass in FIG. 5 represent names of variables set for retrieval, First, the method retrieval unit 4 collates class name included in the call message provided from the program execution unit 3 with a reference table (not shown in drawings) to obtain an object class number of the class objected by the message to be set to a variable ObjectClass, step ST1. Next, same collation is executed about the method name included in the message to obtain a method class number of the designated method to be set to a variable MethodPointer, step ST2.

Subsequently, the method retrieval unit 4 obtains the object class number of the class belonged by the method which is designated by the entry shown by the variable MethodPointer in the method table 9, to be set to a variable MethodClass, step ST3.

In step ST4, the variable ObjectClass is compared with the variable MethodClass. When both classes agree, the sequence moves from step ST4 to step ST5 to read out a program starting address stored at the entry pointed by the variable MethodPointer in the method table 9, The read out address is transmitted to the program execution unit 3 as a program counter designating the stored location of the method to complete the retrieval.

When the variable ObjectClass does not agree with the variable MethodClass, the sequence moves from step ST4 to step ST6 to read out overwrite information of entry pointed by the variable MethodPointer in the method table 9. The method number of the overwrite information is set to a variable SearchPointer and the object class number is set to a variable SearchClass for application to step ST7.

In step ST7, the variable ObjectClass is compared with the variable SearchClass. When both classes agree, the sequence moves to step ST8 wherein a program starting address is read out from the entry pointed by the variable SearchPointer in the method table 9 to be transmitted to the program execution unit 3 as the program counter for completion of the retrieval When the variable ObjectClass does not agree with the variable SearchClass in step ST7, the sequence moves to step ST9 wherein overwrite information is read out from the entry pointed by the variable SearchPointer of method retrieval table. The variables SearchPointer and SearchClass are revised by the method number and object number of the overwrite information, and the sequence returns to step ST7 through step ST10. Same sequence is repeated until the variable ObjectClass agrees with the variable SearchClass. When the variable ObjectClass agrees with the variable SearchClass, the sequence moves to step ST8 in which the program starting address pointed by the variable Search-Pointer at the current time point is read out to be transmitted to the program execution unit 3 as a program counter.

When the overwrite information read out in step ST9 is located at the end of the connection list, SearchClass=null is produced by a revise process of the variables, and an YES response from step ST10 is applied to step ST11.

In step ST11, an object class number assigned to a super class of the class to be objected by the message is read out by retrieving the class table 8 by the variable ObjectClass, and the read out object class number revises the variable ObjectClass for application to step ST4. When the program starting address of the above-mentioned method is read out in step ST5 or ST8 after execution of same process as the above-mentioned process, this retrieval process finishes.

If the program starting address cannot be specified by retrieving the most significant class retroactively, the object class number revised in step ST11 becomes "null", and an YES response is produced from step ST12 where a predetermined process against an anomaly condition is executed to finish the retrieval.

An embodiment of a retrieval process according to the flow chart of FIG. 5 will be described hereinafter based on the relationship of classes and the list structure of the overwrite information shown in FIGS. 2 to 4.

(1) In case the object of the class C executes the C.run( ) method

In steps ST1 and ST2, the object class number [0x3] of the Class C is set as an variable ObjectClass, and the method number [0x3] of C.run( ) is set as a variable MethodPointer. In step ST3, the object number [0x3] of the class to which the method belongs is read out from the entry pointed by the variable MethodPointer of the method table 9 in step ST3 to be set as the variable MethodClass.

In the comparison step ST4, the agreement between the variables ObjectClass and MethodClass is confirmed and the sequence moves to step ST5, In step ST5, the program starting address is read out from the entry pointed by the variable MethodPointer of the method table 9, viz. the entry of [0x02] to be transmitted to the program execution unit 3 as a program counter to finish the retrieval. The C.run( ) method designated thereby is read out to be executed.

About other class provided with run( ) method, a program starting address is read out by same procedure as the above-described procedure when the object of the other class executes a method of its own class.

(2) In case the object of the class C is cast as class A (plays as class A) to execute the A.run( ) method In the same manner as the above (1), a subject of execution of the method is the object of class C, the object class number [0x03] of class C is set to a variable Object-Class in step ST3.

In step ST2, the method number [0x01] of the designated A.run( ) method is set to a variable MethodPointer. In step ST3, the object class number [ x1] of the position class of the A.run( ) method is read out from the entry pointed by the variable MethodPointer of the method table 9 to be set as a variable MethodClass. The result of the inquiring step ST4 is "ObjectClass≠MethodClass" to apply a NO response to step ST6. In step ST6, the overwrite information of the entry pointed by the variable MethodPointer in the method table 9, viz. the entry of [0x01], is read out to set the method number [0x02] of the overwrite information as a variable SearchPointer and the object class number [0x3] of the same as a variable SearchClass respectively, and the sequence moves to step ST7.

In step ST7, an YES response "ObjectClass=MethodClass" is applied to step ST8 in which a program starting address is read out from the entry pointed by the variable SearchPointer [0x02] set in the method table 9 by step ST6, viz. the entry of the C.run( ) method to which the class C belongs, to be transmitted as a program counter. Thus, in the same manner as the above (1), the C.run( ) method is read out to be executed.

When, as to the class G, E or Z provided with other run( ) method, the object of the class is cast as a super class and the execution of the run( ) method of the super class is designated, the run( ) method of its own class is read out in the same manner as the above procedure. Accordingly, the class provided with the overwritten method may keep a rule of Java such that the method of its own class is executed during casting as the super class (3) In case the object of the class B executes the B.run( ) method In step ST1, [0×2] which is the object class number of the class B is set as a variable ObjectClass for application to step ST2 where a variable MethodPointer is set. The class B does not overwrite the run( ) method, thereby setting the method number [0×01] of the A.run( ) method of the class A, a super class, as the variable MethodPointer. Subsequently, in step ST3, the object number [0×1] of the position class of the A.run( ) method is read out from the entry pointed by the variable MethodPointer of the method table 9 to be set as a variable MethodClass.

The result of the inquiring step ST4 is "ObjectClass≠MethodClass", and a NO response is applied to step ST6. In step ST6, [0×02] is set as a variable SearchPointer and [0×3] is set as a variable SearchClass, respectively, based on the overwrite information of the entry pointed by the variable MethodPointer in the method table 9. The sequence moves to the inquiry step ST7 where "ObjectClass≠MethodClass" is judged to produce a NO response.

In response to the NO response, the method retrieval unit 4 moves the sequence to step ST9 where, based on the overwrite information of the entry pointed by the above-mentioned variable SearchPointer, the variable Search-Pointer is revised to [0×03] and the variable SearchClass is revised to [0×5], to be returned to step ST7. The result of the inquiring step ST7 is still NO response, thereby repeating the inquiring process by step ST7 with revising the variables SearchPointer and SearchClass in the same manner.

As the variable SearchPointer is revised to [0×04], and the variables SearchPointer and SearchClass are revised according to the overwrite information read out from the entry pointed by the revised variable SearchPointer, these variables become "null". Thereby, step ST10 produces an YES response to be applied to step ST11 where the object class number [0×1] of class A which is a super class of the above-mentioned class B is read out, and the variable ObjectClass is revised by the number.

When the revised variable ObjectClass is compared with the variable MethodClass upon returning to step ST4, both classes agree so as to apply an YES response to step ST5 where the program starting address pointed by the above-mentioned variable MethodPointer [0×01] is read out to be transmitted as the program counter for finishing the retrieval. Thus, the A.run( ) method succeeded by the class B is called to be executed.

When the object of class B is cast as class A to execute the A.run( ) method, the A.run( ) method is called in the same manner as the above-mentioned procedure. In other class (class D, F or Y) not provided with its own run( ) method, when the execution of the run( ) method in the other class is designated, retrieval is executed in a same procedure as the above-mentioned procedure, resulting in calling the run.( ) method succeeding from the super class to be executed.

(4) In case the object of the class C is cast as an object of the class X having no hierarchical relationship to execute an X.run( ) method In the same manner as those of the above (1) and (2), the object class number [0×03] of the class c is set as a variable ObjectClass in step ST1. In step ST2, the method class number [0×05] of the designated X.run( ) method is set as a variable MethodPointer. Next, in step ST3, the object class number [0×08] of the position class of the method is read out from the entry pointed by the variable MethodPointer in the method table 9 to be set as a variable MethodClass.

The result of the inquiring step ST4 is "ObjectClass≠MethodClass", a NO response is applied to step ST6. In step ST6, the overwrite information of the entry pointed by the variable MethodPointer in the method table 9 is read out to revise the variables SearchPointer and SearchClass, thereby revising the variable SearchPointer to [0×A] and the variable SearchClass to [0×06] respectively for application to step ST7.

In step ST7, a NO response is produced to be applied to step ST9 in which the variables SearchPointer and Search-Class are revised by the overwrite information pointed by the variable SearchPointer. Then, the respective variables become "null", and the sequence moves from step ST10 to step ST11 in which the object class number [0×1] of class A which is a super class is read out from the class table 8, and the read out number revises the variable ObjectClass. Retrieval by the variable ObjectClass is executed, but the same process as the above-mentioned process is advanced to provide "SearchClass=null", and the variable ObjectClass is revised in step ST11.

The contents read out from the class table 8 in step ST11 is "null"stored in the entry of [0×1], so that step ST12 produces an YES response to finish the retrieval after processing an anomaly status.

Thus, when the execution of the method of class in which any hierarchical relationship is not set is designated, the execution becomes impossible, thereby regarding it as execution of an improper program to stop the process.

Accordingly, when the object of class overwriting a run( ) method is designated to execute the run( ) method, even if the designated method is a method of a super class, the method belonging to the own class is called to be executed by tracing the connection list of method information in which the object class number of the own class plays as a key. When the object of class succeeding a run( ) method in silence from its super class is designated to execute the run( ) method, the retrieval in which the object class number of the super class plays as a key is initiated after retrieving the method table wherein the object class number of the own class is the key, thereby easily obtaining the storage location of the run( ) method belonging to the super class.

Thus, the storage location of the designated method may be correctly obtained by setting the retrieval key based on the class name and method name shown in the message of the method calling to trace the connection list of the method information and relation with the super class.

The method information is connected in series and the storage location of the method is uniquely specified from the respective method information, thereby simplifying the data structure of the method table. The entry is set only about the produced class and method in the class table 8 and method table 9, no that any unnecessary memory area like the conventional hash table is not necessary to be ensured, resulting in utilization of the memory resource. Moreover, the entry to each table is executed by inherent numbers in each class and method, thereby avoiding the risk of collision caused by employing a hash table. Simplification of the retrieval path may provide a high speed retrieval processing.

According to the above-mentioned retrieval table, the revision of setting information may be smoothly executed when a class overwriting a method is revised or a new class is added.

Figure 6:
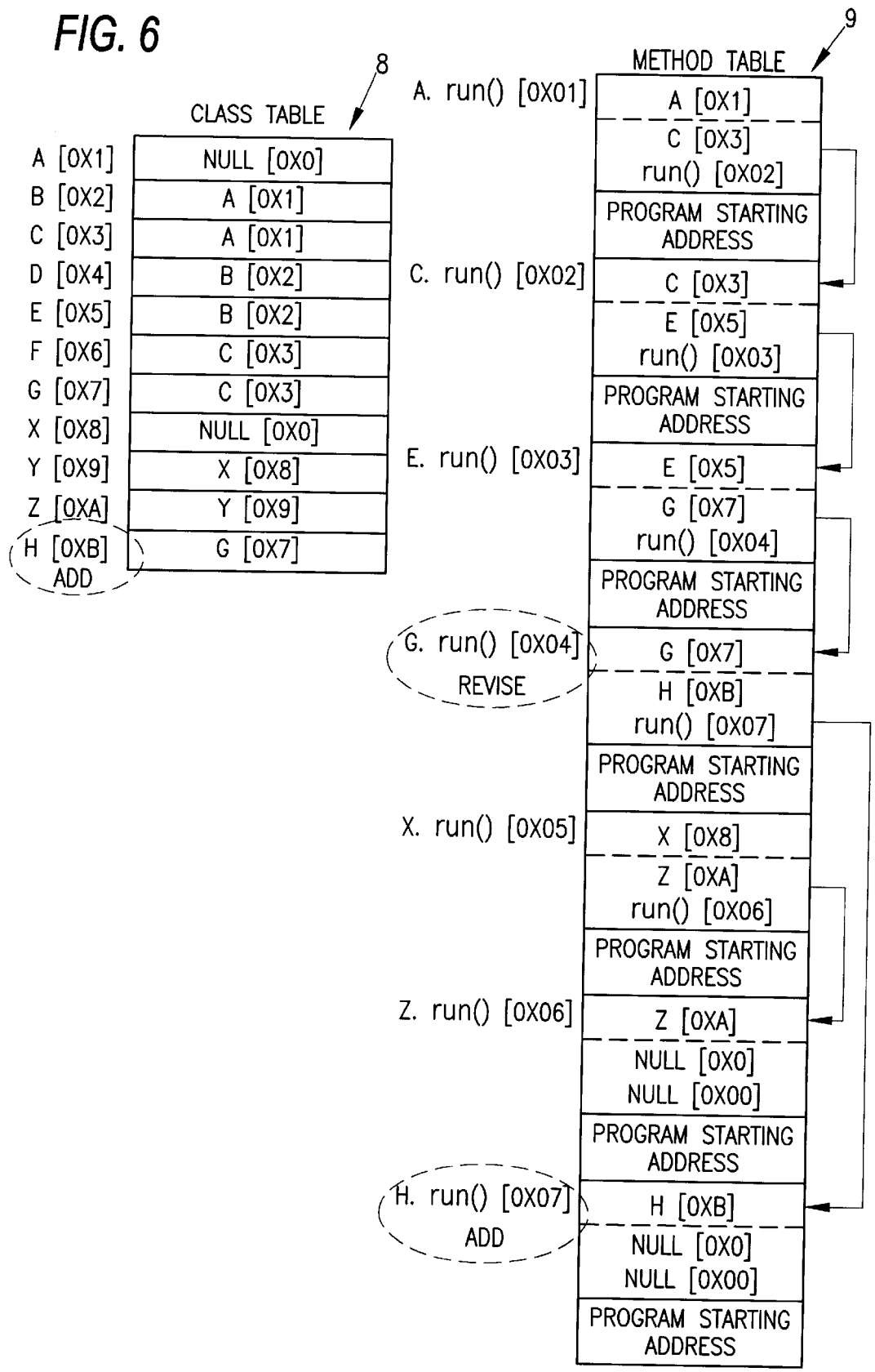
FIG. 6 shows class and method tables illustrating a retrieval table changed by addition of a class and a method.
Figure 7:
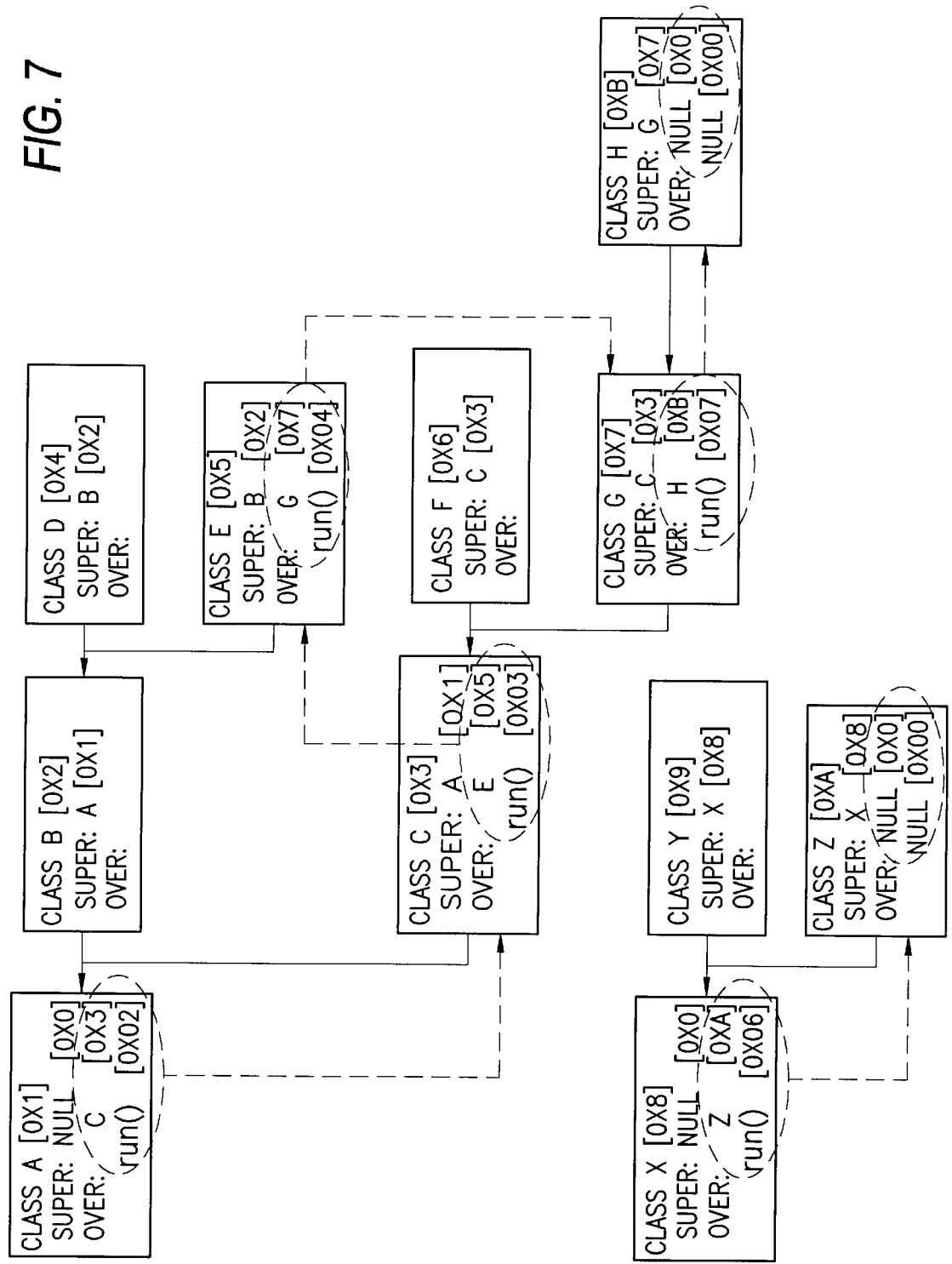
FIG. 7 shows a class relationship showing a retrieval path by the retrieval table of FIG. 6.
Figure 8:
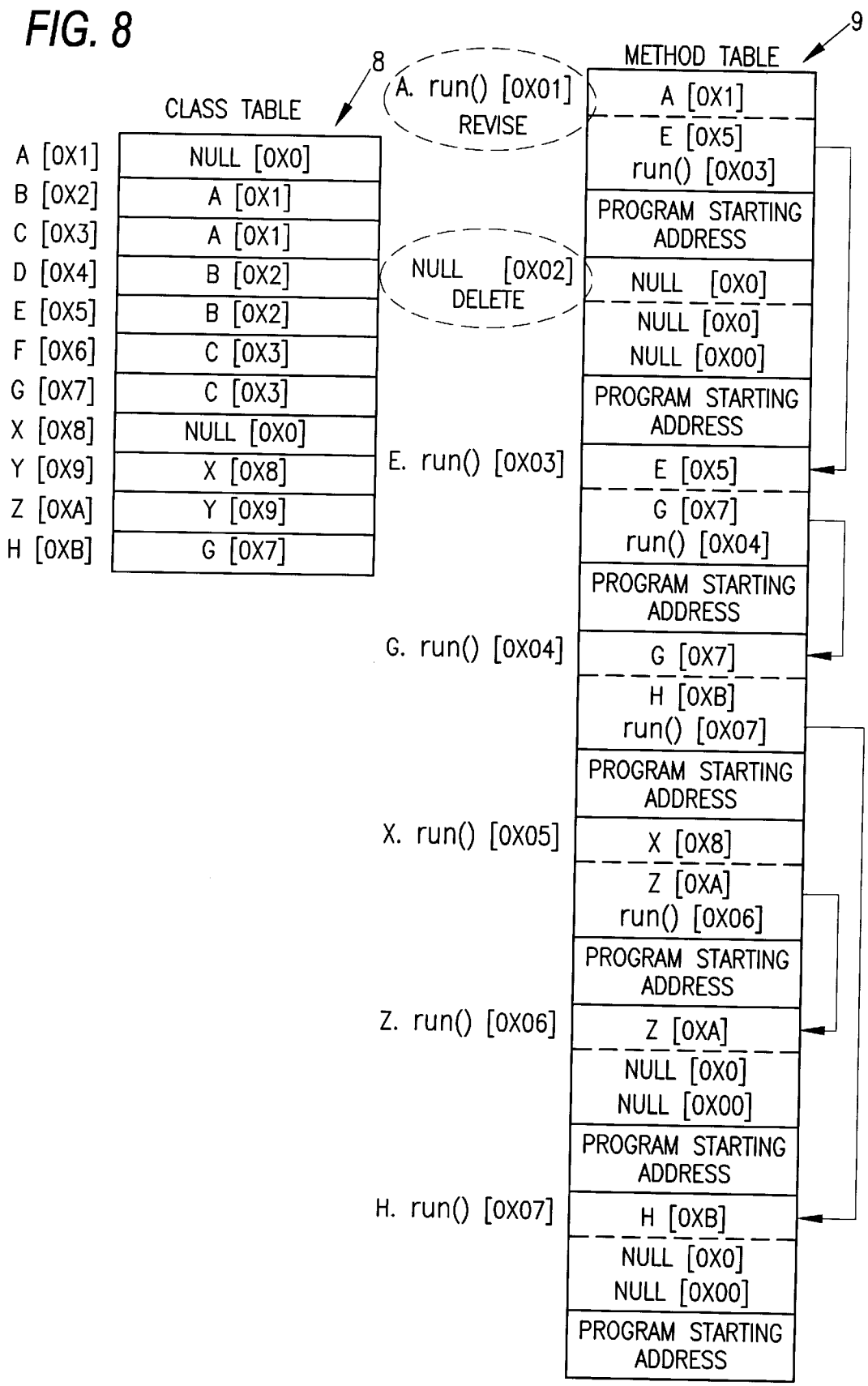
FIG. 8 shows class and method tables illustrating a retrieval table changed by deletion of a method.
Figure 9:
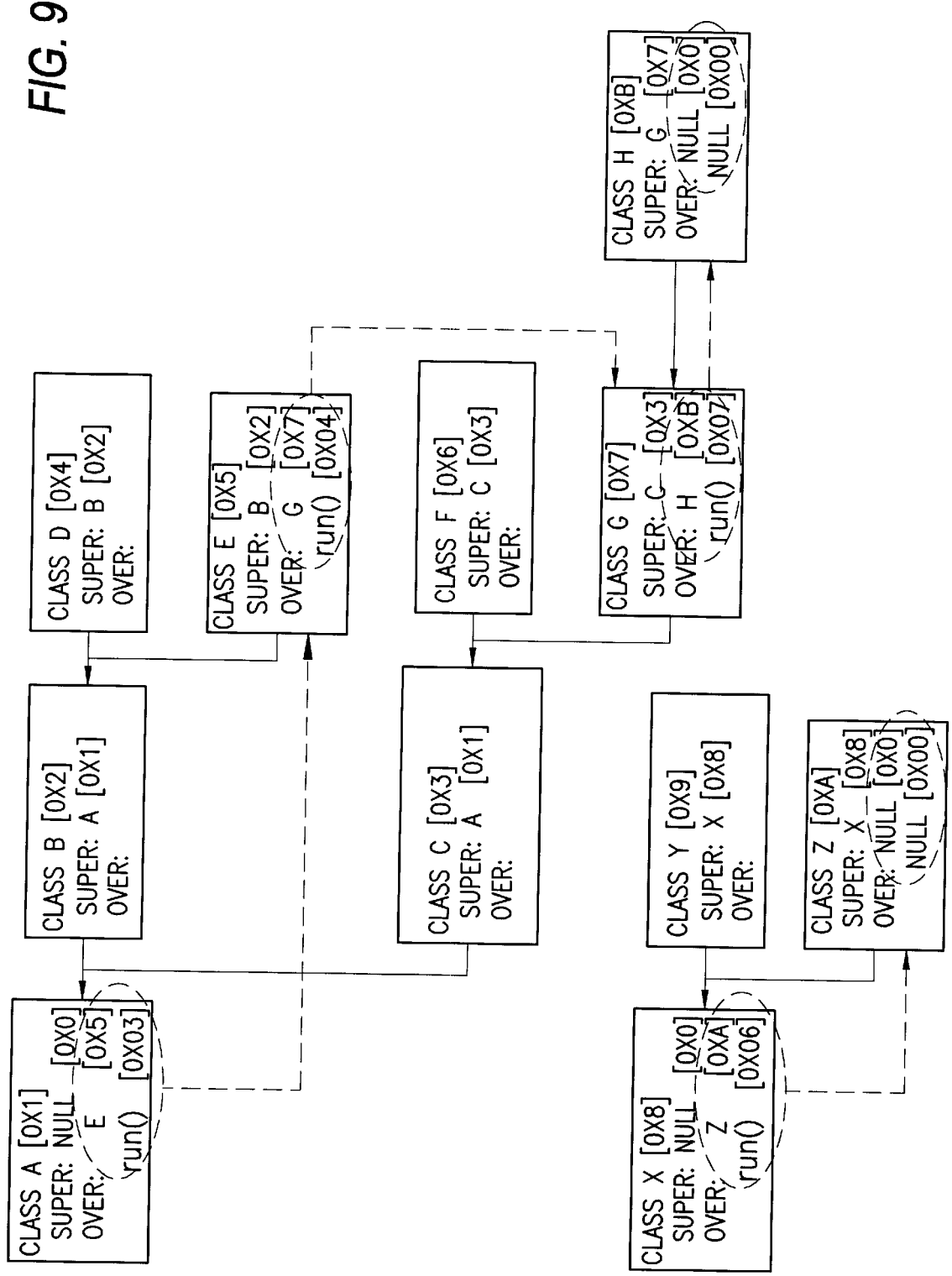
FIG. 9 shows a class relationship showing a retrieval path by the retrieval table of FIG. 8.
Figure 10:
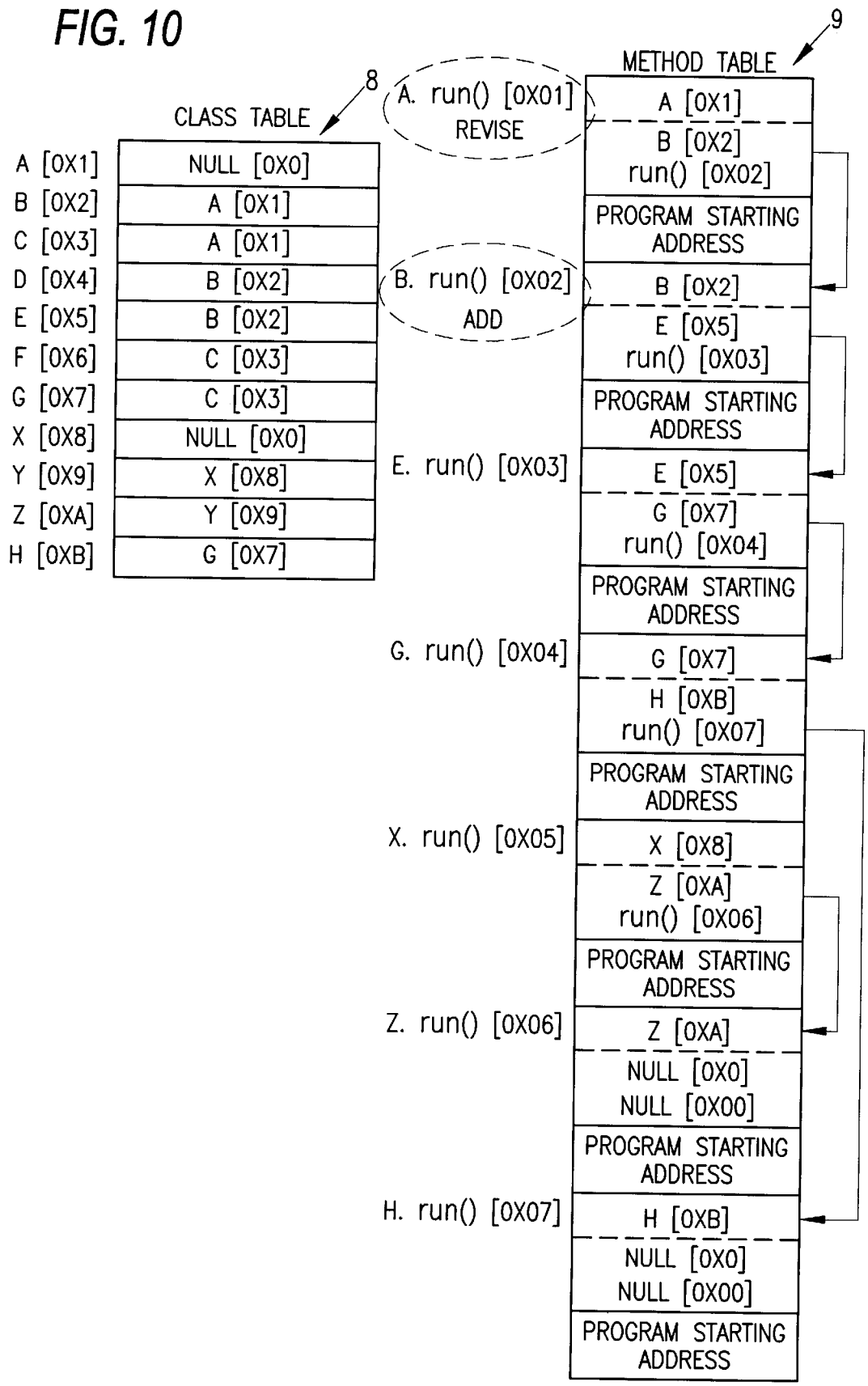
FIG. 10 shows class and method tables illustrating a retrieval table changed by addition of a method.
Figure 11:
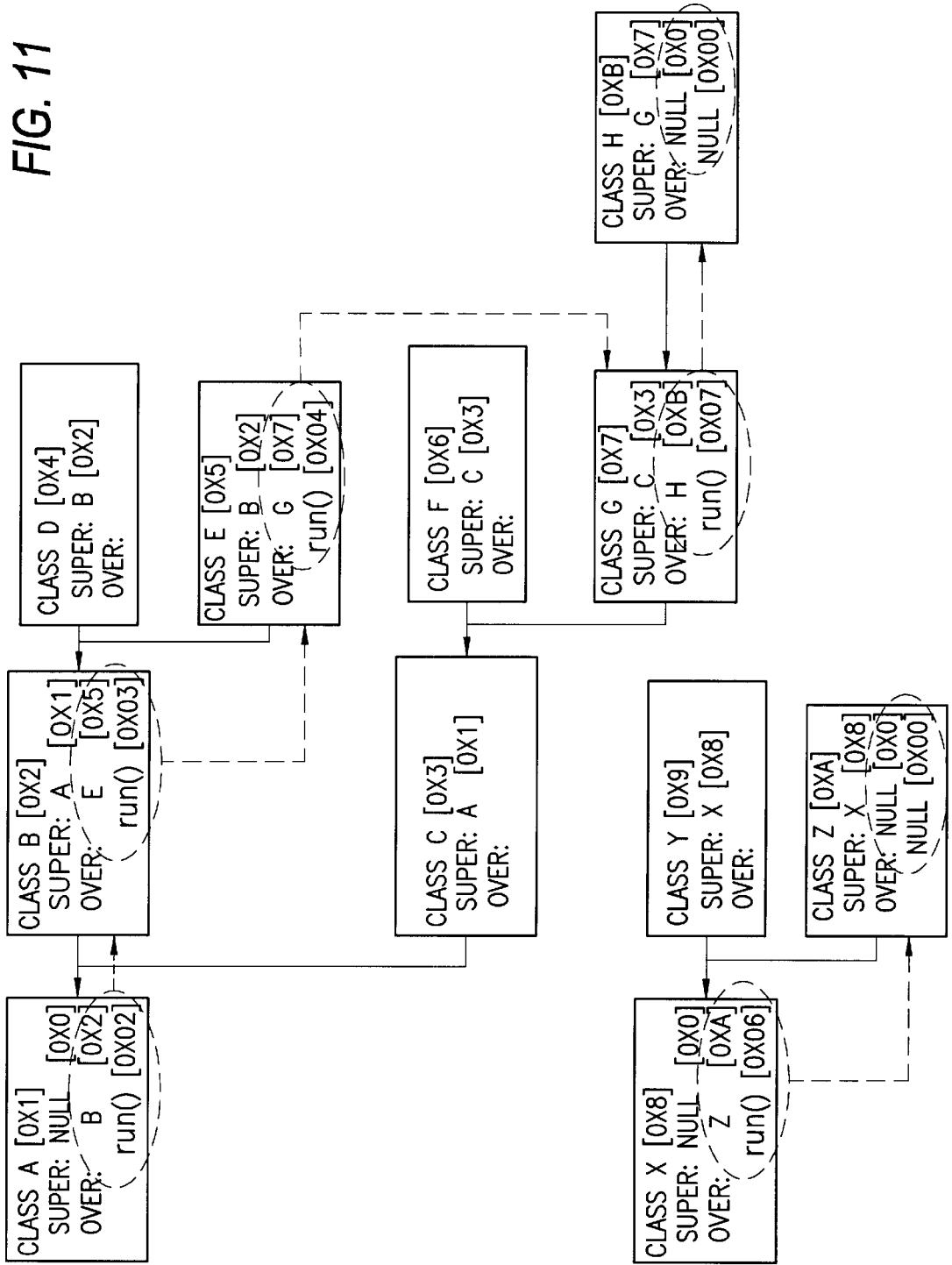
FIG. 11 shows a class relationship showing a retrieval path by the retrieval table of FIG. 10.

In FIGS. 6, 8, and 10, there are shown examples of revising the retrieval table when the design of a program is changed. FIGS. 7, 9 and 11 show a relationship between classes in the respective examples together with a retrieval path according to a list structure of overwrite information. Examples of revision of retrieval tables shown in the figures will be described hereinafter.

FIGS. 6 and 7 show an example of a new class H added into the class relationship shown in FIGS. 2 and 4. The class H has a super class of the class G, and overwrites the G.run( ) method included in the class G.

According to this revision, a pointer [0×B] expressing a subsequent entry in the class table 8 is given as an object class number. At the entry of [0×B] there is stored an object class number [0×7] of the class G which is the super class of the class H.

The pointer [0×07] expressing the subsequent entry in the class table 9 is assigned to the H.run( ) method belonging to the class H as a method number. At the entry there are stored the object class number [0×B] of the H class which is the position class of the H.run( ) method and a starting address of a storage location of the H.run( ) method.

This H.run( ) method overwrites the G.run( ) method which has been the end of the connection list. Accordingly, the overwrite information at the entry of the G.run( ) method is revised to the information expressing the connection to the H.run( ) method, and the overwrite information of the H.run( ) method is set to "null" together with the object class number and method number. Unless the H class overwrites the run( ) method, only an entry for the class table 9 is set.

FIGS. 8 and 9 show an example where the c class is revised to a class in which the run( ) method is not overwritten in the class relationship of FIG. 7. In this case, the hierarchical relationship between classes does not change, whereby the class table 8 is not changed.

In the method table 9, according to deletion of the C.run( ) method, all data of the entry (entry shown by the pointer [0×02]) of this method is revised to "null". The overwrite information of the A.run( ) method is so revised that the A.run( ) method at a higher order of the C.run( ) method may be connected with the E.run( ) method subsequent to the C.run( ) method in the connection list.

FIGS. 10 and 11 shows an example in which the class B having no run( ) method is revised to the class overwriting run( ) method in the class relationship shown in FIG. 9. In this case, the hierarchical relationship between classes does not change, whereby the class table 8 is not changed.

In the method table 9, according to the production of the B.run( ) method, the entry of the pointer [0×02] which is formed to be a blank area by deleting the C.run( ) method is set to the entry of the B.run( ) method, and the pointer [0×02] is set to the method number of the B.run( ) method. At this entry there are stored an object class number [0×02] of the class B which is the position class of the B.run method and the starting address of the stored location of the B.run( ) method. The class B is a super class of the class E, so that a new B.run( ) method is required to be inserted between the A.run( ) method and the E.run( ) method. Accordingly, each overwrite information of the A.run( ) method and B.run( ) method is revised to set the order of A.run( )→ B.run( )→E.run( ).

In the class table B and method table 9, entry information of each class and method is connected through the object class number and method number which serve as pointers of the respective entries, whereby, when new information is registered in each table, the registered information may be set to an optional area within the table as described in the above embodiments. In order to execute new registration or deletion of a method, overwrite information has only to be revised at a switching portion of the connection list of the method information, whereby design change of programs may be easily handled.

The memory area used at the retrieval table area 7 may be dynamically ensured in response to new entry, thereby effectively utilizing the memory resource and flexibly handling the design change of programs.

Setting of the above-mentioned retrieval table may be applied not only to a system of Java, but also in general to any system having a hierarchical relationship where super class is limited to a single one.

When, in the system employing a multiple succession mode like C++ wherein a method and property is succeeded from two super classes, there may be a relationship where only either one of the two super classes may overwrite the method, a method table like FIG. 3 may be set, wherein the class table employs a conventional hash table.

Figure 12:
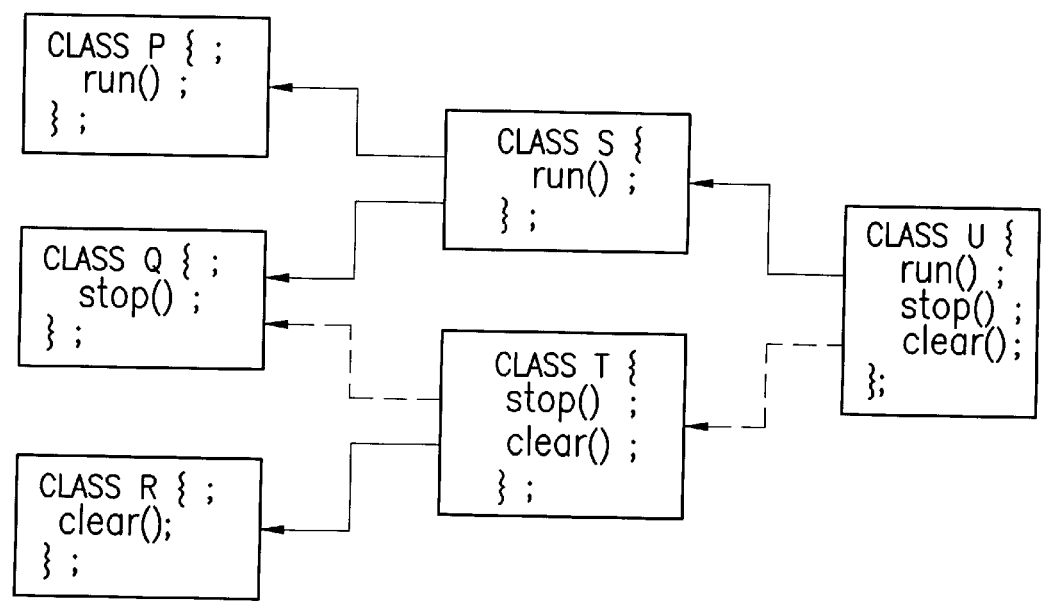
FIG. 12 shows a class relationship representing classes having a relationship of multiplex succession applied by this invention.

FIG. 12 shows an example where the above-mentioned method table may be set between classes having a multiple succession relationship, in which classes P and Q are super classes of a class S, and classes Q and R are super class of a class T. There is produced a class U at lower order of the classes S and T which are supper classes of the class U.

Among three classes P, Q and R at the higher order, only the class P has a run( ) method which is overwritten in the order of class S and class U along the hierarchical relationship (the relationship of overwrite of the run( ) method is shown by thick solid lines). In the same manner, the stop( ) method belonging to the class Q is overwritten in the order of class T and class U along the hierarchical relationship (the relationship of overwrite of the stop( ) method is shown by dotted lines). The clear( ) method belonging to the class R is overwritten in the order of class T and class U along the hierarchical relationship. Thus, in each method of run( ), stop( ) and clear( ), the direction of overwrite is limited to one direction along the hierarchical relationship between classes, whereby the information specifying the stored location of each method may be connected based on the hierarchical relationship between the classes.

Having described an embodiment of this invention, it will now be apparent to those skilled in the art that many changes may be made without departing from the inventive concepts. It should be understood, therefore, that the invention should not be restricted to its disclosed embodiment, but rather should be limited only by the spirit and scope of the appended claims.

What is claimed is:

1. A computer implemented method for generating method retrieval information for a predetermined method succeeded by a plurality of classes having a hierarchical relationship, comprising the steps of:

storing a predetermined method in a computer readable medium;

setting information specifying a stored location for said predetermined method and a method overwriting said predetermined method;

generating retrieval information where each of said setting information is connected one after another based on a hierarchical relationship between position classes of the respective methods; and specifying the storage location of the method to be called by retrieving said retrieval information when a call message is applied to a program executing means, wherein said setting information is stored in a first and second data structure, said first data structure comprises a plurality of class data related to one or more of said plurality of classes, said second data structure comprises a plurality of method table data for methods that extend a higher level class by inheritance with another method.

2. An arithmetic processing apparatus comprising:

a memory storing retrieval information to retrieve a stored location of a method called by each of a plurality of classes having a hierarchical relationship generated by said object to oriented program, and retrieval means for specifying the stored location of the method to be called by retrieving said retrieval information when a call message is applied to said program executing means, said retrieval information including the information connected with the information specifying a stored location of a method and the method overwriting said method for each kind of methods based on a hierarchical relationship between position classes of the respective methods, wherein said hierarchical relationship between position classes is based on a relationship between said plurality of classes comprising higher level classes and lower level classes that are related to one or more said higher level classes based on inheritance, and wherein said stored location of a method is stored for a plurality of methods comprising methods associated with one of said higher level classes having a method and methods associated with one of said lower level lasses comprising, a method and processing sequences inherited from one of said higher level classes.

3. An arithmetic processing apparatus according to claim 2 wherein said memory includes a method retrieval table for storing said information specifying the stored location of said method in a connected fashion based on a hierarchical relationship between position classes of the respective methods and a class retrieval table for storing a hierarchical relationship of each class set by said hierarchical relationship, and said retrieval means subsequently revises and aimed class in a direction rising with hierarchy from the class calling said method based on said class retrieval table to be subsequently retrieved in a direction going down with hierarchy from the method designated by said message, thereby extracting information corresponding to said aimed class.

4. The method of claim 1, wherein said method overwriting said predetermined method comprises a method that extends a higher level class by inheritance with another method.

5. The method of claim 1, wherein said plurality of class data comprises a first, second and third class data, where said class data is determined based upon inheritance based relationships.

6. The method of claim 5, wherein said first class data comprises a class name.

7. The method of claim 5, wherein said second class data comprises a class object identifier, said first data structure comprises a plurality of said class object numbers, each of said class object identifiers is assigned based upon an inheritance relationship between one of said plurality of classes and one of said higher level classes.

8. The method of claim 5, wherein said third class data comprises a subclass number.

9. The method of claim 1, wherein said a plurality of method table data for methods that extend a higher level class by inheritance with another method each comprises a first, second, third and fourth data.

10. The method of claim 9, wherein said first data comprises a method name.

11. The method of claim 9, wherein said second data comprises a first method identifier.

12. The method of claim 9, wherein said third data comprises a second method identifier for a class that inherits class data associated with said first method identifier.

13. The method of claim 9, wherein at least one said method table data comprises a second class data, said second class data references a subclass that comprises a method.

* * * * *